Jan. 14, 1941.　　　N. JANCO　　　2,228,458

ENGINE

Filed March 20, 1939

Inventor.
NATHAN JANCO.
By J. Vincent Martin
and
Ralph K. Browning
Attorneys

Patented Jan. 14, 1941

2,228,458

UNITED STATES PATENT OFFICE 2,228,458

ENGINE

Nathan Janco, Houston, Tex., assignor to Reed Roller Bit Company, Houston, Tex., a corporation of Texas Application March 20, 1939, Serial No. 262,935

3 Claims. (Cl. 121—71)

This invention relates to steam engines, and has for its general object the provision of a steam engine with an improved bearing arrangement.

The particular embodiment illustrated in the drawing relates to a steam engine of the rotary type in which the steam acts directly upon vanes formed on a rotor carried by the power shaft of the engine. The application, however, is not limited to this type of engine but may be employed as well on other types as, for example, a turbine.

In the past it has been customary and has been supposed to be necessary to pack off those portions of the shafts of steam engines which were carried by the bearings so that steam would not have access to such bearings. This was particularly true where the bearings were of anti-friction type such as roller bearings or ball bearings, because of the damage which it was assumed would be done to the bearings by contact with steam from the engine proper.

However, it has been found that the presence of steam in and through the bearings of this type of engine has certain advantages which are not obtained if the steam is not present. For example, the steam it has been found serves to create a definite and more or less fixed temperature condition under which the bearing operates at all times. This not only prevents the bearing from overheating and thereby becoming damaged, but it makes it possible to more accurately foretell the conditions in the bearing during the operation of the machine and to properly design the bearing for such conditions.

It is therefore an object of this invention to provide an engine of the general type set forth in which the bearings will at all times operate under a substantially constant temperature.

Another object of this invention is to provide an engine of the type set forth with a bearing arrangement which will be positively prevented from overheating.

Another object of this invention is to provide a device of the type set forth with a bearing arrangement which may be maintained at a substantially constant temperature by means of the power fluid being used.

One other object of this invention is to provide a steam engine of the type referred to in which the operating conditions within the bearings may be definitely predetermined and provided for.

Another object of this invention is to provide an engine of the type set forth which will be more efficient in its operation and more sturdy in construction.

Other objects and advantages of this invention will become apparent from the following description taken in connection with the accompanying drawing, it being understood that the same are by way of illustration and example only and not by way of limitation.

Figure 2:
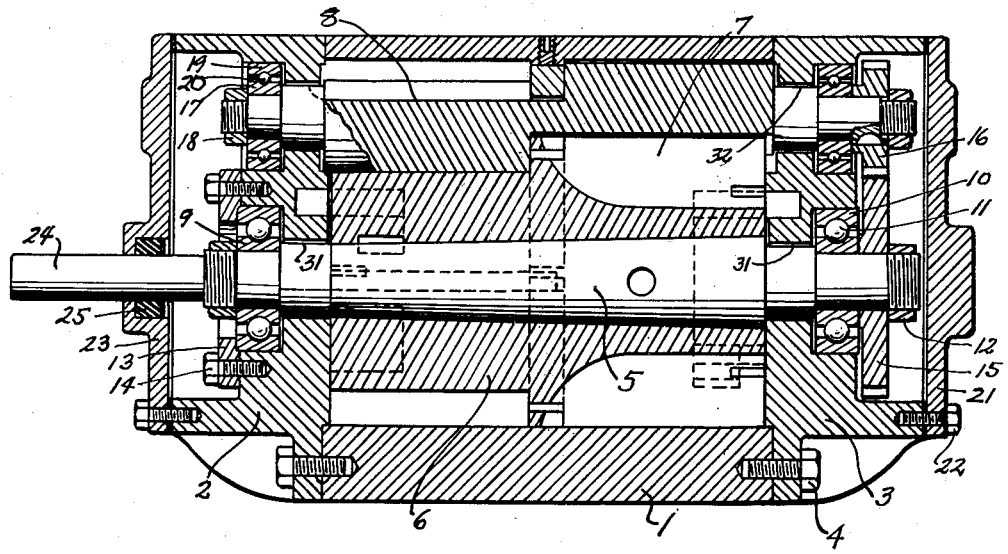
Fig. 2 illustrates a vertical cross section through the axis of the engine illustrated in Fig. 1.

Referring more particularly to the drawing, the numeral 1 designates the body of the engine and the numerals 2 and 3 the end members thereof which are secured to the body by suitable means such as the bolts 4. Within the body and mounted upon a suitable shaft-like member 5 is a rotor 6 having suitable vanes 7 fixed thereon and adapted to be acted upon by steam under pressure to cause rotation of the engine. A rotating abutment 8 is provided for co-action with the rotor 6 for the purpose of acting as the equivalent of a cylinder head, as termed in the common reciprocating type of engine. The shaft 5 is mounted at its opposite ends in bearings in the end members 2 and 3, respectively, these bearings in the present illustration each consisting of an inner ball race 9 and an outer ball race 10 having balls 11 interposed therebetween. The ball races 9 are held on the ends of the shaft by means of nuts 12 and the outer race 10 at the left end of Fig. 2 of the drawing is held in position by means of a ring 13 secured by means of screws 14. The nut 12 at the right end of the shaft 5 also secures on this shaft a gear 15 which is adapted to co-act with a pinion 16 on the end of the shaft carrying the abutment 8. This shaft likewise is shown as being mounted in anti-friction bearings in the end members 2 and 3, respectively, and carries on its ends inner bearing races 17 secured thereon by means of nuts 18. Outer bearing races 19 are secured in the end members, respectively, and between these bearing races are carried the balls 20. It will be understood that other types of bearing may be used in either or both instances if desired.

At the right end of the engine as illustrated in Fig. 2 of the drawing the bearings are enclosed by means of a head 21 secured in place by cap screws 22, and a similar head is employed at the left end of the engine as shown in this figure, the head in this instance being designated 23. The head 23, however, is provided with an opening therethrough for the passage of the shaft end 24 by which power is transmitted from the engine, and a suitable packing 25 is employed for preventing the escape of steam along the shaft.

Figure 1:
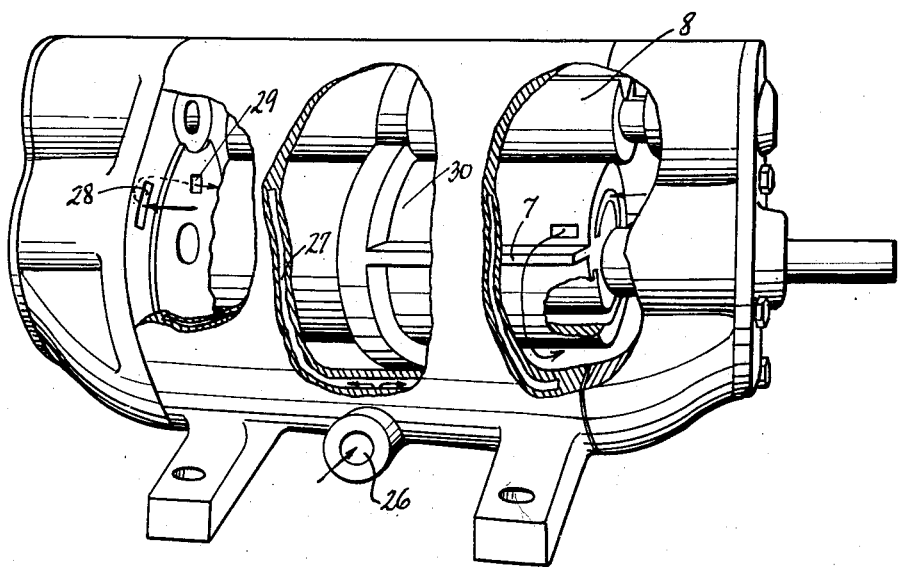
Fig. 1 is a perspective view of an engine constructed in accordance with this invention, parts thereof being broken away for purposes of illustration to show the interior construction and operation thereof.

The steam is adapted to enter the body of the engine through the opening 26 shown in Fig. 1 and enter the space 27 within the hollow walls of the body. From this space the steam is adapted to pass into the end members 2 and 3 through openings 28 and thence through openings 29 in the spaces 30 between the vanes 7 and the abutment 8. The pressure and expansive force of steam within these spaces causes the rotation of the rotor, and this steam is duly exhausted through ports provided for the purpose, as the rotation of the rotor continues.

It is to be noted particularly that there is no attempt to provide any packing between the steam chambers 30 and the bearings hereinbefore described. In fact, a definite space is left through which steam from these pressure spaces 30 may pass into the said bearings, these spaces being designated clearly at 31 and 32 in Fig. 2. It will readily be seen that because of the difference in pressures on the opposite sides of each of the vanes 7 steam will tend to pass from the space on one side of each of these vanes into the bearings and from the bearings toward the space on the opposite side of each of the vanes. There will thus be at all times a slight circulation of steam through the bearings. This leakage of steam will be so slight when the parts are properly proportioned that it will not materially reduce the efficiency of the engine as such, but the net result will be that the bearings will be maintained at a substantially constant temperature depending, of course, upon the pressure at which the engine is operating. By means of the use of stainless material in the bearings any possible corrosion because of the presence of steam may be avoided, and at the same time the constant temperature induced by the presence of this steam, will serve to stabilize the conditions of operation of these bearings and to prevent them from deteriorating as rapidly as they might under the variable conditions which would otherwise exist. It will also be seen that the arrangement set forth eliminates the necessity for the provision of packings and the renewal of the same, thus reducing the initial cost of the engine and decreasing the expense of upkeep, as well as reducing the amount of time necessarily lost in effecting repairs to such packings. On the other hand, the conditions of operation of the bearings may be definitely foretold and provided for in the design thereof.

Due to the elimination of the packings for sealing off the steam from the bearings, it is also possible to place the bearings at the opposite ends of each of the rotary parts closer together thus reducing the amount of vibration and deflection in use, particularly of the rotary abutment 8. This deflection of the abutment 8 is caused by the steam pressure in the space 30 and shortening the distance between the bearings supporting this abutment naturally reduces the amount of the deflection and hence reduces the amount of steam leakage through the rolling contact between the abutment 8 and the rotor 5.

Having described my invention, I claim:

1. In a steam engine, a rotor, non-corrosive rolling bearings for rotatably supporting said rotor, means for applying steam under pressure to said rotor to cause rotation thereof, and means for conducting a portion of said steam to said bearings.

2. In a steam engine, a rotor, anti-friction bearings for rotatably supporting said rotor, and means for applying steam under pressure to said rotor to cause rotation thereof, said bearings being located in restricted communication with the portions of said rotor adapted to receive steam under pressure, whereby steam will pass from said rotor to said bearings and over the entire bearing surfaces of said bearings during the operation of the engine.

3. In a rotary steam engine, a rotor, a rotary abutment mounted adjacent one side of said rotor for rolling movement with respect thereto, and anti-friction bearings for said abutment closely adjacent and in communication with the respective ends thereof whereby steam may enter said bearings and contact the entire bearing surfaces thereof.

NATHAN JANCO.